(12) United States Patent
Sun et al.

(10) Patent No.: US 11,686,897 B2
(45) Date of Patent: Jun. 27, 2023

(54) LIGHT MIXING MODULE, DISPLAY DEVICE HAVING THE LIGHT MIXING MODULE AND DESIGN METHOD FOR THE LIGHT MIXING MODULE

(71) Applicant: DURA-CHIP (NANTONG) LIMITED, Nantong (CN)

(72) Inventors: Zhijiang Sun, Nantong (CN); Shuchang Wang, Nantong (CN); Yang Shen, Nantong (CN)

(73) Assignee: DURA-CHIP (NANTONG) LIMITED, Nantong (CN)

( * ) Notice: Subject to any disclaimer, the term of this patent is extended or adjusted under 35 U.S.C. 154(b) by 0 days.

(21) Appl. No.: 17/569,498

(22) Filed: Jan. 5, 2022

(65) Prior Publication Data
US 2022/0214492 A1    Jul. 7, 2022

(30) Foreign Application Priority Data
Jan. 7, 2021 (CN) .......................... 202110015612.8

(51) Int. Cl.
  F21V 8/00    (2006.01)

(52) U.S. Cl.
  CPC ......... G02B 6/0073 (2013.01); G02B 6/0055 (2013.01); G02B 6/0068 (2013.01); G02B 6/0081 (2013.01)

(58) Field of Classification Search
  CPC .. G02B 6/0073; G02B 6/0055; G02B 6/0068; G02B 6/0081
  See application file for complete search history.

(56) References Cited

U.S. PATENT DOCUMENTS

2008/0310158 A1* 12/2008 Harbers .................. F21V 14/08
  362/240

* cited by examiner

*Primary Examiner* — Andrew J Coughlin
*Assistant Examiner* — Jessica M Apenteng (57) ABSTRACT

A light mixing module, a display device having the light mixing module, and a design method for the light mixing module are provided. The light mixing module includes a main substrate with a printed circuit, and at least one chip-level light emitting unit arranged on the main substrate. The chip-level light emitting unit includes a LED chip, a backlight bracket, a shading element and a supporting element. The backlight bracket is mounted on the main substrate, and the backlight bracket has a cup-shaped reflecting surface surrounding the LED chip. The shading element is suspended right above the LED chip by the supporting element.

18 Claims, 4 Drawing Sheets

LIGHT MIXING MODULE, DISPLAY DEVICE HAVING THE LIGHT MIXING MODULE AND DESIGN METHOD FOR THE LIGHT MIXING MODULE

CROSS-REFERENCE TO RELATED APPLICATIONS

This application claims all benefits accruing under 35 U.S.C. § 119 from China Patent Application No. 202110015612.8, filed on Jan. 7, 2021, in the China National Intellectual Property Administration, the content of which is hereby incorporated by reference.

TECHNICAL FIELD

The present disclosure generally relates to a light mixing module, a display device having the light mixing module, and furthermore, to a design method for the light mixing module.

BACKGROUND

A Mini light-emitting diode (LED) backlight is not fundamentally different from a LED backlight, and the Mini LED backlight belongs to a backlight technology where a size of a single LED is greatly reduced. Typically, when used as a light mixing module, the LED is packaged on a printed circuit board (PCB) board and arranged in a matrix. Since a number of LEDs is far more than a number of Cold Cathode Fluorescent Lamps (CCFL), each LED can be used as an independent light source to form a dynamic partition backlight to improve a dynamic contrast of a display device and achieve a High Dynamic Range (HDR) display. When a size of the LED is reduced, forming a Mini LED lighting mixing module requires more LED lights and more dynamic partitions, which can be easily manufactured into a curved surface. In terms of a technical principle, the Mini LED backlight is actually an upgrade of a LED backlight. Originally, a LED lamp strip is only one lamp strip, and a brightness spread is realized by using a light guide plate, while the Mini LED backlight is realized by using a large number of ultra-small LED lamp groups to achieve a backlight effect. In this way, the Mini LED backlight can not only allow the Local Dimming Zones to achieve a HDR and a high contrast effect, but also shorten an optical distance (OD) to reduce a thickness of a machine to meet a requirement of a thin shape.

A straight down backlight module at present generally adopts a five-side light source which includes a backplane, a reflector, a LED lamp strip, a support column, a diaphragm and so on. As a central brightness of the five-side LED light source is higher than a surrounding brightness thereof, an emitting light of the LED light source will be concentrated in a central area of the light, a gap exists between irradiation areas of two LED lights, a dark area may be generated in the irradiation areas, and the light mixing is uneven.

In a conventional backlight technology solution, a light emitting angle of the five-side LED light source is small, usually about 150°. A light intensity right above the LED is higher than that around the LED, so it is necessary to disperse the light emitting right above the LED to a surrounding of the LED with a help of a lens, but an ability of the lens to disperse light is limited, it is easy that dark areas are generated between adjacent light sources, resulting in a light and dark junction of a surface light source and uneven light. When a mixing distance increases, an overall thickness of the backlight module will increase and a system will become thick. Increasing a thickness and a number of diaphragm layers will also increase the thickness and a cost of the backlight module.

SUMMARY

The present disclosure provides a light mixing module with a reflective structure, which uses reflected light to compensate a dark area of a backlight module, solving a technical problem of uneven brightness of a light emitting surface of a light mixing module, and also providing a display device having the mixing module and a design method for the light mixing module.

To solve the above technical problem, a technical scheme of the present disclosure is as follows: a light mixing module includes a main substrate with a printed circuit, at least one chip-level light emitting unit arranged on the main substrate, and a diffusion plate arranged above the chip-level light emitting unit. The chip-level light emitting unit includes a LED chip, a backlight bracket, a shading element and a supporting element.

The LED chip is directly or indirectly mounted on the main substrate to achieve driving control.

The backlight bracket is mounted on the main substrate, and the backlight bracket has a cup-shaped reflecting surface surrounding the LED chip.

The shading element is suspended right above the LED chip by the supporting element.

The cup-shaped reflecting surface is configured for reflecting a light directly emitted from the chip and a light reflected from the shading element to an area to be filled with light, and a cone area within an angle $\theta_B$ relative to a main light emitting direction of the LED chip is defined as the area to be filled with light, and the angle $\theta_B$ of the area to be filled with light is in a range of 0 to ±30°.

Alternatively, the LED chip is covered with a packaging layer, and the packaging layer is arranged on a top and a side wall of the LED chip to form a spherical package or a Chip Scale Package (CSP) chip.

Alternatively, the LED chip is a RGB three-color chip, and three three-color chips are collectively covered in the packaging layer.

Alternatively, the LED chip is mounted on a sub-substrate, the sub-substrate is mounted on the main substrate, and an upper surface of the sub-substrate surrounding the LED chip is coated with a lower reflective layer.

Alternatively, a width of the lower reflective layer ranges from 0.5 mm to 1.5 mm.

Alternatively, the sub-substrate and the backlight bracket are an integral structure.

Alternatively, a lower edge of the cup-shaped reflecting surface is lower than a lower surface of the LED chip.

Alternatively, a lower surface of the shading element is a spherical structure or a cone structure with a downward sag in a center thereof.

Alternatively, an angle between a conical surface of the cone structure and the horizontal plane ranges from 0° to 25°.

Alternatively, the shading element and the supporting element are integrally molded on the backlight bracket.

Alternatively, a distance between a lower surface of the shading element and a bottom surface of the LED chip ranges from 0.2 mm to 1.0 mm.

Alternatively, the supporting element includes a plurality of supporting columns, the shading element is suspended right above the LED chip by the plurality of several supporting columns, and lower ends of the plurality of supporting columns are fixed on the main substrate or the backlight bracket.

Alternatively, the supporting element includes a suspended grid-like frame, each of a plurality of chip-level light emitting units shares the grid-like frame, a shading element located right above the LED chip is fixed in a grid of the grid-like frame.

Alternatively, the supporting element includes a supporting column suspended under a lower surface of the diffusion plate, and a lower end of the supporting column is connected with the shading element.

Alternatively, the supporting column includes a transparent column on the lower surface of the diffusion plate, and a lower surface of the transparent column is a spherical structure or an inverted cone structure with a downward projection in a center thereof, a surface of the spherical structure or the inverted cone structure is directly covered with a high reflective layer by electroplating, spraying or immersing a coating, and the high reflective layer is defined as the shading element.

Alternatively, a surface of the supporting element is provided with a high reflective layer, or the supporting element is made of a transparent material, and a top cross section of the supporting element gradually decreases from bottom to top.

The present disclosure further provides a display device, including a backlight source, which is the light mixing module described above.

The present disclosure further provides a design method for the light mixing module. The design method includes the following steps:

At step 1, a maximum value $DHR_{MAX}$ of DHR for the light mixing module is determined.

At step 2, a specification of the LED chip of the chip-level light emitting unit is selected.

At step 3, a suitable specification of the shading element for the chip-level light emitting unit is selected.

A relationship between $D_Z$ and $D_X$ meets the following formula: $D_X < D_Z < D_X + 2H_Z * \tan 30°$, and the $H_Z$ ranges from 0.2 mm to 1 mm, the $D_X$ is denoted as an overall size of the LED chip and a packaging layer thereof, the $H_Z$ is denoted as a distance between a lower surface of the shading element and a bottom surface of the LED chip, and the $D_Z$ is denoted as a width of the shading element in the horizontal direction.

Ranges of the $D_Z$ and the $H_Z$ are obtained.

At step 4, specification parameters of the cup-shaped reflecting surface of the backlight bracket are calculated according to following sub-steps:

At step 4.1, an area to be filled with light is set according to an OD height of the light mixing module, to improve a light intensity uniformity of the chip-level light emitting unit at the OD height, ensuring that a light intensity difference at this height does not exceed 15%.

An area within an angle $\theta_B$ relative to a main light emitting direction of the LED chip is defined as the area to be filled with light.

When the $DHR_{MAX}$ of the light mixing module is required up to be 2.75, the angle $\theta_B$ is set to range from −30° to +30°.

When the $DHR_{MAX}$ of the light mixing module is required up to be 3.0, the angle $\theta_B$ is set to range from −30° to +30°.

When the $DHR_{MAX}$ of the light mixing module is required up to be 3.5, the angle $\theta_B$ is set to range from −25° to +25°.

At step 4.2, an area of light filling is calculated according to a total energy required for the area to be filled with light, resulting in reflecting and supplementing the light from the area of light filling to the area to be filled with light by the cup-shaped reflecting surface of the backlight bracket.

An angle relative to a main light emitting direction of the LED chip of the area of light filling is defined as $\theta_O$.

When the $DHR_{MAX}$ of the light mixing module is required up to be 2.75, the angle $\theta_O$ is set to range from −50° to −90° and from 50° to 90°.

When the $DHR_{MAX}$ of the light mixing module is required up to be 3.0, the angle $\theta_O$ is set to range from −70° to −90° and from 70° to 90°.

When the $DHR_{MAX}$ of the light mixing module is required up to be 3.5, the angle $\theta_B$ is set to range from −75° to −90° and from 75° to 90°.

At step 4.3, the light from the area of light filling is reflected according to a light intensity curve to be achieved, to an area between a center of the area to be filled with light and an edge at the other side of the area to be filled with light, by the cup-shaped reflecting surface of the backlight bracket, the light directly emitting towards the lowest layer of the cup-shaped reflective surface is reflected to the edge at the other side of the area to be filled with light, the light directly emitting towards the uppermost layer of the cup-shaped reflective surface is reflected to the center of the area to be filled with light, and the following relationship equations are calculated by optical paths of the light at above two locations, a relationship equation (1) is as follows:

$$L_F = -OD/\tan 2\theta_F - OD*\tan \theta B, \text{ and } L_F > 0 \quad (1);$$

a relationship equation (2) is as follows:

$$H_F = [OD*\sin \theta_O * \cos(2\theta_F - \theta_O)] / [2*\sin(\theta_F - \theta_O)*\cos(\theta_F - \theta_O)] \quad (2).$$

The OD is denoted as a known OD height position, the $L_F$ is denoted as a horizontal distance between the lowest layer of the cup-shaped reflecting surface of the backlight bracket and the LED chip, the $H_F$ is denoted as a height of the cup-shaped reflecting surface of the backlight bracket, the $\theta_F$ is denoted as an angle between the cup-shaped reflecting surface of the backlight bracket and the horizontal plane.

A function relationship between the $L_F$ and the $H_F$ is obtained.

At step 4.3, ranges of the $L_F$ and the $D_F$ are limited:

A relationship equation (3) is obtained according to a condition that the light reflected from the lowest layer of the cup-shaped reflecting surface to the edge at the other side of the area to be filled with light needs to avoid shading of the shading element:

$$OD*\tan \theta_B + \tfrac{1}{2}D_Z \leqslant OD*\tan \theta_B + L = (OD*\tan \theta_B + L_F) * (OD - H_Z)/OD;$$

i.e., $OD*\tan \theta_B + \tfrac{1}{2}D_Z \leqslant (OD*\tan \theta_B + L_F)*(OD - H_Z)/OD;$ $$L_F \geqslant (OD*\tan \theta_B + \tfrac{1}{2}D_Z)*OD/(OD - H_Z) - OD*\tan \theta_B > 0 \quad (3).$$

The L is denoted as a horizontal distance between a center perpendicular line of the LED chip and the light reflected from the lowest layer to the edge at the other side of the area to be filled with light at a height of the shading element.

A relationship equation (4) is obtained according to a condition of a width range of a lower reflective layer:

$$L_F \geqslant L_{lower} + \tfrac{1}{2}D_X, \text{ and } L_{lower} \text{ is in a range of 0.5 mm to 1.5 mm} \quad (4).$$

At step 5, the $L_F$ and the corresponding $H_F$ are determined:

Specific $D_Z$, $H_Z$ and OD values are selected and substituted into relationship equations (1), (2), (3) and (4) to calculate a value range that simultaneously satisfy the relationship equations (1), (2), (3) and (4); and the value range of $L_F$ and the corresponding value range of $H_F$ and $\theta_F$ are taken as a basic parameter range of the cup-shaped reflecting surface.

The present disclosure includes the following advantages: (1) the backlight structure can use part of the light reflected by the light source effectively to compensate the light of a light emitting layer of the backlight module, so that a brightness distribution of the light emitting layer is more uniform. A reflected light compensation method not only solves the problem of uneven brightness of the light emitting layer of the light mixing module, but also avoids the loss of the reflected light and improves the brightness and an overall display effect. (2) After using the backlight structure of the present disclosure, a space between the LED light sources can be increased while the thickness of the display module and the mixing module remains unchanged, so as to reduce the usage of the LED light sources and effectively reduce the production and manufacturing cost of the light mixing module. (3) A light compensation technical scheme of the light mixing module of the present disclosure can realize a regional extinction, improve a dynamic display range and further improve a display performance (4) The design method for the light mixing module provided by the present disclosure can quickly meet the requirements of design of different HDR and greatly improve a manufacturing efficiency.

DETAILED DESCRIPTION 0F THE EMBODIMENTS

Figure 1:
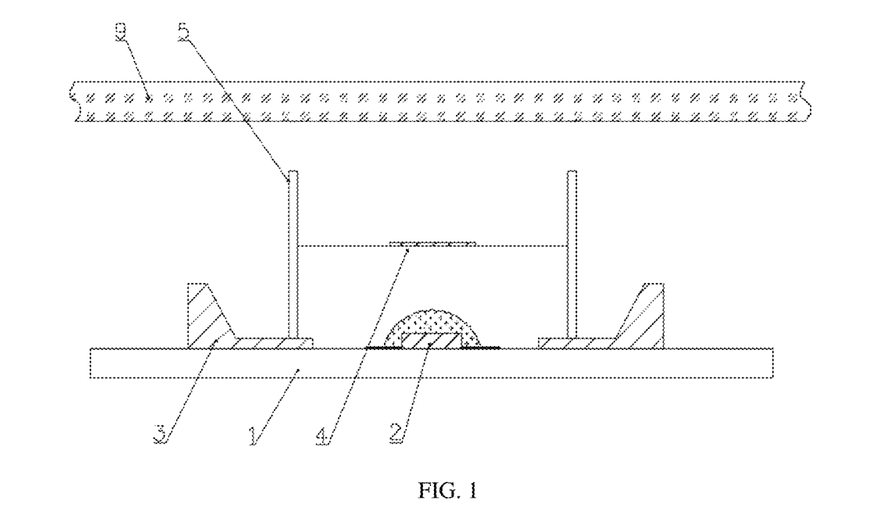
FIG. 1 is a schematic diagram of a light mixing module in the present disclosure.

The light mixing module of the present disclosure as shown in FIG. 1 includes a main substrate 1 with a printed circuit, at least one chip-level light emitting unit arranged on the main substrate 1, and a diffusion plate 9 arranged above the chip-level light emitting unit. The chip-level light emitting unit includes a LED chip 2, a backlight bracket 3, a shading element 4 and a supporting element 5.

The LED chip 2 is directly or indirectly mounted on the main substrate 1 to achieve driving control. The LED chip 2 can be covered with a packaging layer 8, and the packaging layer 8 is arranged on a top and a side wall of the LED chip 2 to form a spherical package or a CSP chip.

The backlight bracket 3 is mounted on the main substrate 1, and the backlight bracket 3 has a cup-shaped reflecting surface surrounding the LED chip 2.

The shading element 4 is suspended right above the LED chip 2 by a plurality of supporting elements 5. Lower ends of the plurality of supporting elements 5 are fixed on the main substrate 1 or the backlight bracket 3.

When the above light mixing module is used as a backlight source in a display device, a height between the diffusion plate 9 and a bottom of the LED chip 2 is defined as an OD height.

On the horizontal plane at the OD height, a cone area within an angle $\theta_B$ relative to a main light emitting direction of the LED chip is defined as an area to be filled with light, and the angle $\theta_B$ is in a range of $-30°$ to $+30°$. An area within an angle $\theta_O$ with the main light emitting direction of the LED chip is defined as an area of light filling, and the angle $\theta_O$ is in a range of $-50°$ to $-90°$ and $50°$ to $90°$.

The cup-shaped reflecting surface of the backlight bracket 3 meets the following conditions:

The light directly emitted from the chip and reflected from the shading element is reflected to the area to be filled with light by the cup-shaped reflecting surface of the backlight bracket. Alternatively, the light from the area of light filling is reflected to an area between a center of the area to be filled with light and an edge at the other side of the area to be filled with light, by the cup-shaped reflecting surface of the backlight bracket, the light directly emitting towards the lowest layer of the cup-shaped reflective surface is reflected to the edge at the other side of the area to be filled with light, the light directly emitting towards the uppermost layer of the cup-shaped reflective surface is reflected to the center of the area to be filled with light.

A First Embodiment

Figure 2:
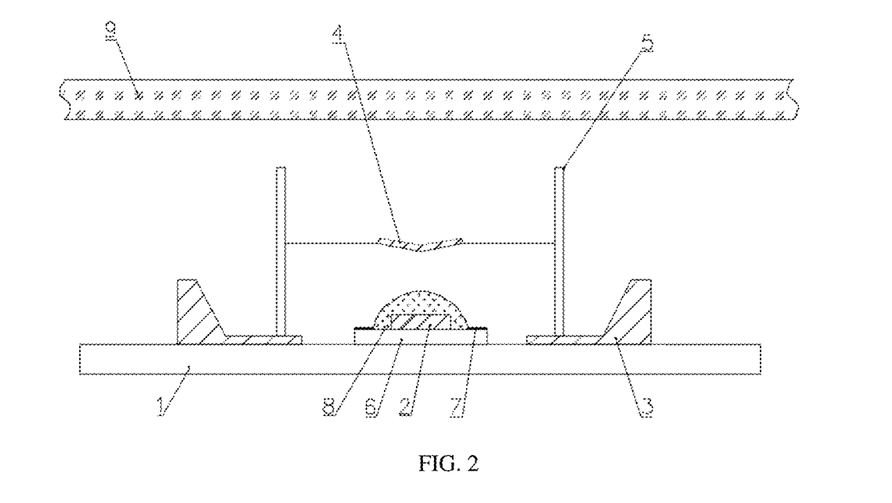
FIG. 2 is a schematic diagram of a light mixing module in a first embodiment of the present disclosure.

In the present embodiment, as shown in FIG. 2, the LED chip 2 is indirectly mounted on the main substrate 1. Specifically, the LED chip 2 is mounted on a sub-substrate 6, the sub-substrate 6 is mounted on the main substrate 1, and an upper surface of the sub-substrate 6 surrounding the LED chip 2 is coated with a lower reflective layer 7, which is configured to reflect the light emitting towards the sub-strate to a side of a light emitting surface to achieve an effect of mixed light filling and improve a utilization rate of the light. In the present embodiment, a width of the lower reflective layer ranges from 0.5 mm to 1.5 mm. The LED chip 2 is covered with a packaging layer 8, and the packaging layer 8 is arranged on the top and the side wall of the LED chip 2 to form a spherical package. The packaging layer 8 is a spherical or rectangular transparent adhesive formed by molding and dispensing, which is conducive for light emission and light mixing more evenly inside.

A lower surface of the shading element 4 can be either a flat surface or a cone structure with a downward sag in the center. In the present embodiment, an angle between a conical surface of the cone structure and the horizontal plane is greater than 0 but not more than 25°, and the angle is recommended to range from 5° to 25°. A distance between the lower surface of the shading element 4 and a bottom surface of the LED chip 2 ranges from 0.2 mm to 1.0 mm Within this distance, a light mixing layer has a good uniformity of overall mixing.

Furthermore, the sub-substrate 6 and the backlight bracket 3 are an integral structure, which can control a mounting accuracy more accurately, reduce times of mounting and positioning, and improve a manufacturing efficiency.

In addition, several schemes are suitable for the supporting element 5:

The supporting element 5 includes a plurality of supporting columns, the shading element 4 is suspended right above the LED chip 2 by the plurality of supporting columns, and lower ends of the plurality of supporting columns are fixed on the main substrate 1 or the backlight bracket 3, as shown in FIG. 2.

Figure 3:
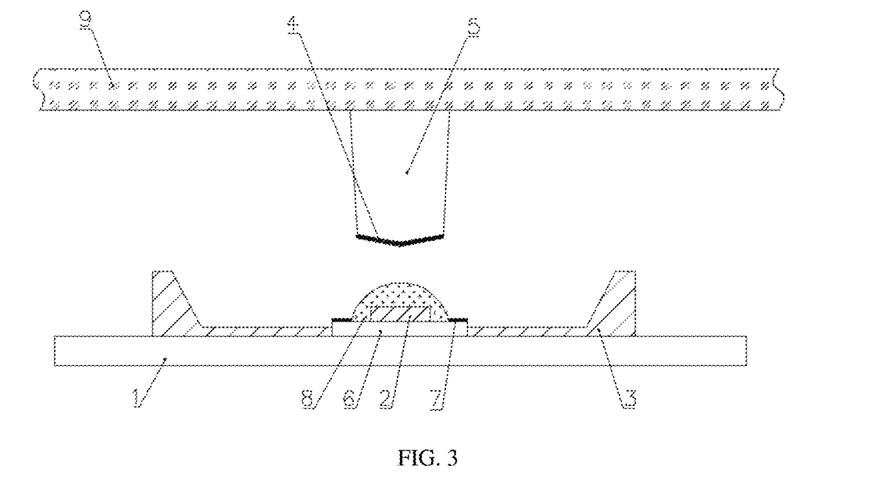
FIG. 3 is a schematic diagram of a light mixing module using a second supporting element in the first embodiment of the present disclosure.

The supporting element 5 includes a plurality of supporting columns suspended under a lower surface of the diffusion plate, and a lower end of the plurality of supporting columns are connected with the shading element 4, as shown in FIG. 3.

Figure 4:
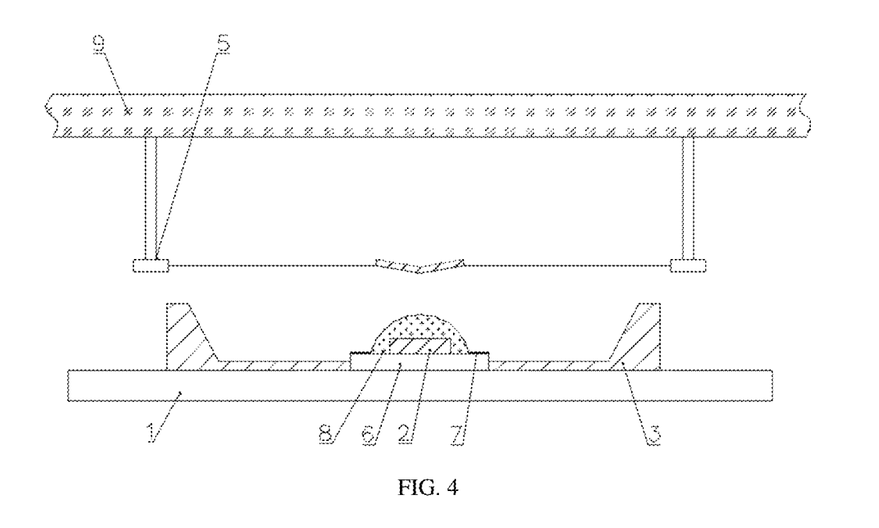
FIG. 4 is a schematic diagram of a light mixing module using a third supporting element in the first embodiment of the present disclosure.

The supporting element 5 includes a suspended grid-like frame. Each of a plurality of chip-level light emitting units shares the grid-like frame, and a shading element located right above the LED chip is fixed in a grid of the grid-like frame, as shown in FIG. 4.

A surface of the supporting element 5 is provided with a high reflective layer, or the supporting element 5 is made of a transparent material, and a top cross section of the supporting element 5 gradually decreases from bottom to top.

Furthermore, a lower edge of the cup-shaped reflecting surface of the backlight bracket 3 is lower than a lower surface of the LED chip 2, so as to collect a wider range of the light for reflection.

A Second Embodiment

Figure 5:
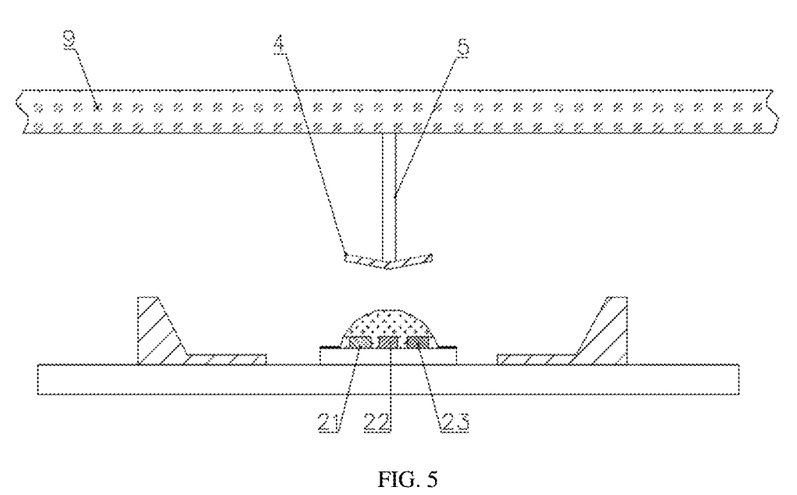
FIG. 5 is a schematic diagram of a light mixing module in a second embodiment of the present disclosure.

The structure in the second embodiment is substantially the same as that in the first embodiment. The light mixing module includes a main substrate 1 with a printed circuit, at least one chip-level light emitting unit arranged on the main substrate 1. The chip-level light emitting unit includes a LED chip 2, a backlight bracket 3, a shading element 4 and a supporting element 5, and a connection relation is also the same as that in the first embodiment. The LED chip 2 is also covered with a packaging layer 8. The difference between the second embodiment and the first embodiment is as follows:

In the present embodiment, the LED chip 2 is a RGB three-color chip, and three three-color chips 21, 22, 23 are collectively covered in the packaging layer 8. Alternatively, the packaging layer 8 is a transparent adhesive layer. A light source packaging unit is formed after multiple LED chips are packaged together.

In the present embodiment, a relationship between $D_Z$ and $D_X$ meets the following formula: $D_X<D_Z<D_X+2H_Z*\tan 30°$, the $H_Z$ ranges from 0.2 mm to 1 mm, the $D_X$ is denoted as an overall size of the LED chip and a packaging layer thereof, the $H_Z$ is denoted as a distance between a lower surface of the shading element and a bottom surface of the LED chip, and the $D_Z$ is denoted as a width of the shading element in the horizontal direction. It should be noted that the $D_X$ contains the packaging layer. If the LED chip 2 is a RGB three-color chip, the $D_X$ is the overall size of three three-color chips collectively covered in the packaging layer.

In the present embodiment, the light mixing module of the above first embodiment (the lower surface of the shading element is a flat surface) is used as the backlight source of the display device. According to different DHR requirements, the following parameters of the shading element are selected:

A maximum value of DHR that the light mixing module is required to achieve is denoted as $DHR_{MAX}$. The DHR refers to a ratio between a space of adjacent packaging units in the light mixing module and a distance between the LED chip and the light mixing layer. In the first embodiment, the LED chip and the packaging layer are regarded as a whole as a packaging unit, and in the second embodiment, the three three-color LED chips and the packaging layer are regarded as a whole as a packaging unit.

$\theta_F$ is denoted as an angle between the cup-shaped reflecting surface of the backlight bracket and the horizontal plane, $L_F$ is denoted as a horizontal distance between the lowest layer of the cup-shaped reflecting surface of the backlight bracket and the LED chip, and $H_F$ is denoted as a height of the cup-shaped reflecting surface of the backlight bracket. $\theta_F$, $L_F$, and $H_F$ meet the following formulas.

When $DHR_{MAX}$ is 2.75, OD is 4 mm in the light mixing module, $1.243 \text{ mm} \leq L_F \leq 2.356 \text{ mm}$, $40° \leq \theta_F \leq 60°$, $0<H_F \leq 0.696 \text{ mm}$.

When $DHR_{MAX}$ is 3.0, OD is 6 mm in the light mixing module, $1.04 \text{ mm} \leq L_F \leq 1.618 \text{ mm}$, $40° \leq \theta_F \leq 60°$, $0<H_F \leq 1.044 \text{ mm}$.

When $DHR_{MAX}$ is 3.5, OD is 9 mm in the light mixing module, $0.885 \text{ mm} \leq L_F \leq 1.509 \text{ mm}$, $40° \leq \theta_F \leq 60°$, $0<H_F \leq 1.566 \text{ mm}$.

The light mixing module with any one of the above structures can be used as a backlight source of the display device.

A Third Embodiment

The present disclosure provides a design method for the light mixing module. The design method includes the following steps:

At step 1, a maximum value $DHR_{MAX}$ of DHR for the light mixing module is determined.

At step 2, a specification of the LED chip of the chip-level light emitting unit is selected.

At step 3, a suitable specification of the shading element for the chip-level light emitting unit is selected: a relationship between $D_Z$ and $D_X$ meets the following formula: $D_X<D_Z<D_X+2H_Z*\tan 30°$, and the $H_Z$ ranges from 0.2 mm to 1 mm, the $D_X$ is denoted as an overall size of the LED chip and a packaging layer thereof, the $H_Z$ is denoted as a distance between a lower surface of the shading element and a bottom surface of the LED chip, and the $D_Z$ is denoted as a width of the shading element in the horizontal direction. Ranges of the $D_Z$ and the $H_Z$ are obtained.

At step 4, specification parameters of the cup-shaped reflecting surface of the backlight bracket are calculated according to following sub-steps:

At step 4.1, an area to be filled with light is set according to an OD height of the light mixing module, to improve a light intensity uniformity of the chip-level light emitting unit at the OD height, ensuring that a light intensity difference at this height does not exceed 15%.

An area within an angle $\theta_B$ relative to a main light emitting direction of the LED chip is defined as the area to be filled with light. When the $DHR_{MAX}$ of the light mixing module is required up to be 2.75, the angle $\theta_B$ is set to range from −30° to +30°. When the $DHR_{MAX}$ of the light mixing module is required up to be 3.0, the angle $\theta_B$ is set to range from −30° to +30°. When the $DHR_{MAX}$ of the light mixing module is required up to be 3.5, the angle $\theta_B$ is set to range from −25° to +25°.

At step 4.2, an area of light filling is calculated according to a total energy required for the area to be filled with light, resulting in reflecting and supplementing the light from the area of light filling to the area to be filled with light by the cup-shaped reflecting surface of the backlight bracket.

An angle relative to a main light emitting direction of the LED chip of the area of light filling is defined as $\theta_O$. When the $DHR_{MAX}$ of the light mixing module is required up to be 2.75, the angle $\theta_O$ is set to range from −50° to −90° and from 50° to 90°. When the $DHR_{MAX}$ of the light mixing module is required up to be 3.0, the angle $\theta_O$ is set to range from −70° to −90° and from 70° to 90°. When the $DHR_{MAX}$ of the light mixing module is required up to be 3.5, the angle $\theta_B$ is set to range from −75° to −90° and from 75° to 90°.

At step 4.3, the light from the area of light filling is reflected according to a light intensity curve to be achieved, to an area between a center and an edge at the other side of the area to be filled with light, by the cup-shaped reflecting surface of the backlight bracket. The light directly emitting towards the lowest layer of the cup-shaped reflective surface is reflected to the edge at the other side of the area to be filled with light, the light directly emitting towards the uppermost layer of the cup-shaped reflective surface is reflected to the center of the area to be filled with light, and the following relationship equations are calculated by optical paths of the light at above two locations:

a relationship equation (1) is as follows:

$$L_F = -OD/\tan 2\theta_F - OD^* \tan \theta B, \text{ and } L_F > 0 \quad (1);$$

a relationship equation (2) is as follows:

$$H_F = [OD^* \sin \theta_O^* \cos(2\theta_F - \theta_O)] / [2^* \sin(\theta_F - \theta_O)^* \cos(\theta_F - \theta_O)] \quad (2).$$

The OD is denoted as a known OD height position, the $L_F$ is denoted as a horizontal distance between the lowest layer of the cup-shaped reflecting surface of the backlight bracket and the LED chip, the $H_F$ is denoted as a height of the cup-shaped reflecting surface of the backlight bracket, and the $\theta F$ is denoted as an angle between the cup-shaped reflecting surface of the backlight bracket and the horizontal plane; and a function relationship between the $L_F$ and the $H_F$ is obtained.

At step 4.4, ranges of the $L_F$ and the $D_F$ are limited.

A relationship equation (3) is obtained according to a condition that the light reflected from the lowest layer of the cup-shaped reflecting surface to the edge at the other side of the area to be filled with light needs to avoid the shading of the shading element:

$$OD^* \tan \theta_B + \tfrac{1}{2} D_Z \leq OD^* \tan \theta_B + L = (OD^* \tan \theta_B + L_F)^* (OD - H_Z)/OD;$$

i.e., $OD^* \tan \theta_B + \tfrac{1}{2} D_Z \leq (OD^* \tan \theta_B + L_F)^* (OD - H_Z)/OD;$ $$L_F \geq (OD^* \tan \theta_B + \tfrac{1}{2} D_Z)^* OD/(OD - H_Z) - OD^* \tan \theta_B > 0 \quad (3).$$

The L is denoted as a horizontal distance between a center perpendicular line of the LED chip and the light reflected from the lowest layer to the edge at the other side of the area to be filled with light at a height of the shading element.

A relationship equation (4) is obtained according to a condition of a width range of a lower reflective layer:

$$L_F \geq L_{lower} + \tfrac{1}{2} D_X, \text{ and } L_{lower} \text{ is in a range of 0.5 mm to 1.5 mm} \quad (4).$$

At step 5, the $L_F$ and the corresponding $H_F$ are determined.

Specific $D_Z$, $H_Z$ and OD values are selected and substituted into relationship equations (1), (2), (3) and (4) to calculate a value range that simultaneously satisfy the relationship equations (1), (2), (3) and (4). The value range of $L_F$ and the corresponding value range of $H_F$ and $\theta_F$ are taken as a basic parameter range of the cup-shaped reflective surface.

Figure 6:
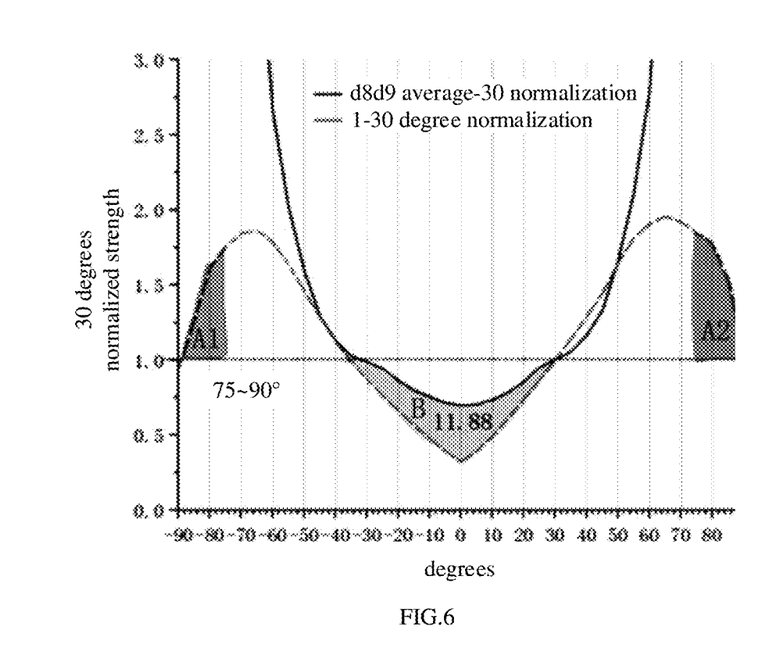
FIG. 6 is a diagram of a light intensity curve before light filling in a design method for a light mixing module and an ideal light intensity curve in the present disclosure.

In the present embodiment, a principle of step 4.3 is as follows: as shown in FIG. 6, a dotted line in the figure is a light intensity curve of a LED chip packaging body before light filling, and a solid line in the figure is an ideal light intensity curve. In order to achieve the ideal light intensity curve after light filling in the area to be filled with light, the present disclosure supplements the energy of shadow areas A1 and A2 on both sides to an area B.

Figure 7:
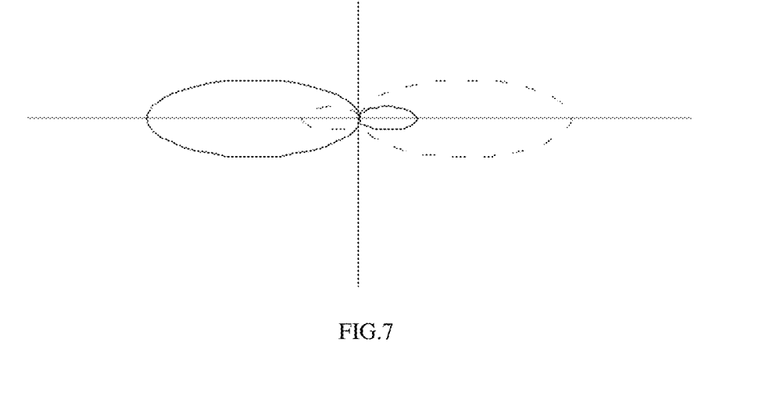
FIG. 7 is a light filling principal diagram of a light mixing layer in a design method for a light mixing module in the present disclosure.

It is actually implemented by two parts: as shown in FIG. 7, a light intensity of the light emitted from the area of light filling and directly towards the uppermost layer of the cup-shaped reflective surface is higher than that of the light emitted from the area of light filling and directly towards the lowest layer of the cup-shaped reflective surface, referring to a large circle area of solid lines and a large circle area of dotted lines in the figure. At the same time, the light stimulated by the LED chip or the light reflected by the shading element is reflected again by a lower reflecting layer surrounding the LED chip and the substrate, having a larger incidence angle relative to the cup-shaped reflecting surface, and most of the light is reflected to a center point of the area to be filled with light which is a little bit closed to a local side, referring to a small circle area of solid lines and a small circle area of dotted lines in the figure.

A relative ideal light intensity curve is finally achieved by a superposition of the above primary and secondary reflections.

A Fourth Embodiment

In the present embodiment, the above design method is used to produce the light mixing module in which $DHR_{MAX}$ needs to reach 2.75. For example, the OD is 4 mm, and the specification of the LED chip includes that a length of the LED chip is 760 μm, a width of the LED chip is 330 μm, and a height of the LED chip is 150 μm, and the thickness of the packaging layer at the top is 230 μm and 120 μm at the side. The calculated result is as follows: 1.243 mm $\leq L_F \leq$ 2.356 mm, 40° $\leq \theta_F \leq$ 60°, 0<$H_F$ 0.696 mm. When the $\theta_F$ is 43°, an overall uniformity measured at the current OD height of the present embodiment is 96.64%.

A Fifth Embodiment

In the present embodiment, the above design method is used to produce the light mixing module in which $DHR_{MAX}$ is required up to be 3.0. For example, the OD is 6 mm, and the specification of the LED chip includes that a length of the LED chip is 760 μm, a width of the LED chip is 330 μm, and a height of the LED chip is 150 μm, and the thickness of the packaging layer is 230 μm at the top and 120 μm at the side. The calculated result is as follows: 1.04 mm $\leq L_F \leq$ 1.618 mm, 40° $\leq \theta_F \leq$ 60°, 0<$H_F \leq$ 1.044 mm. When the $\theta_F$ is 45°, the overall uniformity measured at the current OD height of the present embodiment is 95.91%.

A Sixth Embodiment

In the present embodiment, the above design method is used to produce the light mixing module in which $DHR_{MAX}$ is required up to be 3.5. For example, the OD is 9 mm, and the specification of the LED chip includes that a length of the LED chip is 760 μm, a width of the LED chip is 330 μm, and a height of the LED chip is 150 μm, and the thickness of the packaging layer is 230 μm at the top and 120 μm at the side. The calculated result is as follows: 0.885 mm $\leq L_F \leq$ 1.509 mm, 40° $\leq \theta_F \leq$ 60°, 0<$H_F \leq$ 1.566 mm. When the $\theta_F$ is 54°, an overall uniformity measured at the current OD height of the present embodiment is 94.86%.

We claim:

1. A light mixing module, comprising a main substrate with a printed circuit, at least one chip-level light emitting unit arranged on the main substrate, and a diffusion plate arranged above the chip-level light emitting unit, the chip-level light emitting unit comprising a LED chip, a backlight bracket, a shading element and a supporting element, wherein, the LED chip is directly or indirectly mounted on the main substrate to achieve driving control;

the backlight bracket is mounted on the main substrate, and the backlight bracket has a cup-shaped reflecting surface surrounding the LED chip;

the shading element is suspended right above the LED chip by the supporting element;

the cup-shaped reflecting surface is configured for reflecting a light directly emitted from the chip and a light reflected from the shading element to an area to be filled with light, reflecting the light from an area of light filling to an area between a center of the area to be filled with light and an edge at the other side of the area to be filled with light, reflecting the light directly emitting towards the lowest layer of the cup-shaped reflective surface to the edge at the other side of the area to be filled with light, and reflecting the light directly emitting towards the uppermost layer of the cup-shaped reflective surface to the center of the area to be filled with light, wherein a cone area within an angle $\theta_B$ relative to a main light emitting direction of the LED chip is defined as the area to be filled with light, and the angle $\theta_B$ of the area to be filled with light is in a range of 0 to ±30°.

2. The light mixing module of claim 1, wherein the LED chip is covered with a packaging layer, and the packaging layer is arranged on a top and a side wall of the LED chip to form a spherical package or a CSP chip.

3. The light mixing module of claim 2, wherein the LED chip is a RGB three-color chip, and three three-color chips are collectively covered in the packaging layer.

4. The light mixing module of claim 1, wherein the LED chip is mounted on a sub-substrate, the sub-substrate is mounted on the main substrate, and an upper surface of the sub-substrate surrounding the LED chip is coated with a lower reflective layer.

5. The light mixing module of claim 4, wherein a width of the lower reflective layer ranges from 0.5 mm to 1.5 mm.

6. The light mixing module of claim 4, wherein the sub-substrate and the backlight bracket are an integral structure.

7. The light mixing module of claim 4, wherein a lower edge of the cup-shaped reflecting surface is lower than a lower surface of the LED chip.

8. The light mixing module of claim 1, wherein a lower surface of the shading element is a spherical structure or a cone structure with a downward sag in a center thereof.

9. The light mixing module of claim 8, wherein an angle between a conical surface of the cone structure and the horizontal plane ranges from 0° to 25°.

10. The light mixing module of claim 1, wherein the shading element and the supporting element are integrally molded on the backlight bracket.

11. The light mixing module of claim 1, wherein a distance between a lower surface of the shading element and a bottom surface of the LED chip ranges from 0.2 mm to 1.0 mm.

12. The light mixing module of claim 1, wherein the supporting element comprises a plurality of supporting columns, the shading element is suspended right above the LED chip by the plurality of supporting columns, and lower ends of the plurality of supporting columns are fixed on the main substrate or the backlight bracket.

13. The light mixing module of claim 1, wherein the supporting element comprises a suspended grid-like frame, each of a plurality of chip-level light emitting units shares the grid-like frame, the shading element located right above the LED chip is fixed in a grid of the grid-like frame.

14. The light mixing module of claim 1, wherein the supporting element comprises a supporting column suspended under a lower surface of the diffusion plate, and a lower end of the supporting column is connected with the shading element.

15. The light mixing module of claim 14, wherein the supporting column comprises a transparent column on the lower surface of the diffusion plate, and a lower surface of the transparent column is a spherical structure or an inverted cone structure with a downward projection in a center thereof, a surface of the spherical structure or the inverted cone structure is directly covered with a high reflective layer, and the high reflective layer is defined as the shading element.

16. The light mixing module of claim 1, wherein a surface of the supporting element is provided with a high reflective layer, or the supporting element is made of a transparent material, and a top cross section of the supporting element gradually decreases from bottom to top.

17. A display device, comprising a backlight source, wherein the backlight source is the light mixing module of claim 1.

18. A design method for the light mixing module of claim 1, comprising:

at step 1, determining a maximum value $DHR_{MAX}$ of DHR for the light mixing module;

at step 2, selecting a specification of the LED chip of the chip-level light emitting unit;

at step 3, selecting a suitable specification of the shading element of the chip-level light emitting unit:

wherein a relationship between $D_z$ and $D_x$ meets the following formula: $D_x < D_z < D_x + 2H_z * \tan 30°$, wherein the $H_z$ ranges from 0.2 mm to 1 mm, the $D_x$ is denoted as an overall size of the LED chip and a packaging layer thereof, the $H_z$ is denoted as a distance between a lower surface of the shading element and a bottom surface of the LED chip, and the $D_z$ is denoted as a width of the shading element in the horizontal direction; and obtaining ranges of the $D_z$ and the $H_z$;

at step 4, calculating specification parameters of the cup-shaped reflecting surface of the backlight bracket according to the following sub-steps:

at step 4.1, setting an area to be filled with light, according to an OD height of the light mixing module, to improve a light intensity uniformity of the chip-level light emitting unit at the OD height, ensuring that a light intensity difference at this height does not exceed 15%, wherein an area within an angle $\theta_B$ relative to a main light emitting direction of the LED chip is defined as the area to be filled with light;

when the $DHR_{MAX}$ of the light mixing module is required up to be 2.75, the angle $\theta_B$ is set to range from −30° to +30°;

when the $DHR_{MAX}$ of the light mixing module is required up to be 3.0, the angle $\theta_B$ is set to range from $-30°$ to $+30°$ ; and when the $DHR_{MAX}$ of the light mixing module is required up to be 3.5, the angle $\theta_B$ is set to range from $-25°$ to $+25°$ ;

at step 4.2, calculating an area of light filling according to a total energy required for the area to be filled with light, resulting in reflecting and supplementing the light from the area of light filling to the area to be filled with light by the cup-shaped reflecting surface of the backlight bracket, wherein an angle relative to a main light emitting direction of the LED chip of the area of light filling is defined as $\theta_o$, when the $DHR_{MAX}$ of the light mixing module is required up to be 2.75, the angle $\theta_o$ is set to range from $-50°$ to $-90°$ and from $50°$ to $90°$ ;

when the $DHR_{MAX}$ of the light mixing module is required up to be 3.0, the angle $\theta_o$ is set to range from $-70°$ to $-90°$ and from $70°$ to $90°$ ; and when the $DHR_{MAX}$ of the light mixing module is required up to be 3.5, the angle $\theta_B$ is set to range from $-75°$ to $-90°$ and from $75°$ to $90°$ ;

at step 4.3, reflecting, according to a light intensity curve to be achieved, the light from the area of light filling to an area between a center of the area to be filled with light and an edge at the other side of the area to be filled with light, by the cup-shaped reflecting surface of the backlight bracket, reflecting the light directly emitting towards the lowest layer of the cup-shaped reflective surface to the edge at the other side of the area to be filled with light, reflecting the light directly emitting towards the uppermost layer of the cup-shaped reflective surface to the center of the area to be filled with light, and calculating the following relationship equations by optical paths of the light at above two locations, wherein, a relationship equation (1) is as follows:

$$L_F = -OD/\tan 2\theta_F - OD*\tan\theta_B, \text{ and } L_F > 0 \quad (1)$$

a relationship equation (2) is as follows:

$$H_F = [OD*\sin\theta_o*\cos(2\theta_F - \theta_o)]/[2*\sin(\theta_F - \theta_o)*\cos(\theta_F - \theta_O)] \quad (2);$$

wherein the OD is denoted as a known OD height position, the $L_F$ is denoted as a horizontal distance between the lowest layer of the cup-shaped reflecting surface of the backlight bracket and the LED chip, the $H_F$ is denoted as a height of the cup-shaped reflecting surface of the backlight bracket, and the $\theta_F$ is denoted as an angle between the cup-shaped reflecting surface of the backlight bracket and the horizontal plane; and obtaining a function relationship between the $L_F$ and the $H_F$; and at step 4.4, limiting ranges of the $L_F$ and the $D_F$:

obtaining, according to a condition that the light reflected from the lowest layer of the cup-shaped reflecting surface to the edge at the other side of the area to be filled with light needs to avoid shading of the shading element, a relationship equation (3):

$$L_F \geq (OD*\tan\theta_B + 1/2D_z)*OD/(OD-H_z) - OD*\tan\theta_B > 0 \quad (3);$$

wherein the L is denoted as a horizontal distance between a center perpendicular line of the LED chip and the light reflected from the lowest layer to the edge at the other side of the area to be filled with light at a height of the shading element; and obtaining, according to a condition of a width range of a lower reflective layer, a relationship equation (4):

$L_F \geq L_{lower} + 1/2D_x$, and $L_{lower}$ is in a range of 0.5 mm to 1.5 mm (4); and at step 5, determining the $L_F$ and the corresponding $H_F$:

selecting and substituting specific $D_z$, $H_z$ and OD values into the relationship equations (1), (2), (3) and (4) to calculate a value range that simultaneously satisfy the relationship equations (1), (2), (3) and (4); and taking the value range of $L_F$ and the corresponding value range of $H_F$ and $\theta_F$ as a basic parameter range of the cup-shaped reflecting surface.

\* \* \* \* \*